US012731483B2

(12) United States Patent
Diamond et al.

(10) Patent No.: US 12,731,483 B2
(45) Date of Patent: Sep. 8, 2026

(54) VEHICLE AS A TRAFFIC MANAGEMENT COORDINATOR

(71) Applicant: Ford Global Technologies, LLC, Dearborn, MI (US)

(72) Inventors: Brendan Diamond, Naples, FL (US); Keith Weston, Canton, MI (US); Matthew Penne, Pierce, NE (US); Stuart C. Salter, White Lake, MI (US)

( * ) Notice: Subject to any disclaimer, the term of this patent is extended or adjusted under 35 U.S.C. 154(b) by 2 days.

(21) Appl. No.: 18/981,589

(22) Filed: Dec. 15, 2024

(65) Prior Publication Data

US 2026/0170951 A1 Jun. 18, 2026

(51) Int. Cl.
*G08G 1/00* (2006.01)
*B60Q 1/50* (2006.01)
*G08G 1/04* (2006.01)
*G08G 1/0955* (2006.01)
*G08G 1/0967* (2006.01)

(52) U.S. Cl.
CPC ........... *G08G 1/0955* (2013.01); *B60Q 1/503* (2013.01); *G08G 1/04* (2013.01); *G08G 1/096791* (2013.01)

(58) Field of Classification Search
CPC .. G08G 1/0955; G08G 1/04; G08G 1/096791; G08G 1/00; B60Q 1/503
USPC .......................................................... 701/117
See application file for complete search history.

(56) References Cited

U.S. PATENT DOCUMENTS 11,565,722 B2 1/2023 Oh et al.
2019/0196482 A1* 6/2019 Reiley ...................... B60Q 1/26
2020/0348689 A1* 11/2020 McEnroe ............. G05D 1/0276
2021/0248915 A1* 8/2021 Jacobus .................. H04W 4/02
2021/0380138 A1* 12/2021 Kucharski .............. G08B 21/02
2022/0410796 A1* 12/2022 Oya ........................ B60Q 1/525
2023/0159058 A1* 5/2023 Polyakov ............... B60Q 1/549
701/25

FOREIGN PATENT DOCUMENTS

KR 101878811 B1 7/2018
WO 2023012028 A1 2/2023

OTHER PUBLICATIONS

Soufiene Djahel, et al., Toward V2I Communication Technology-Based Solution for Reducing Road Traffic Congestion in Smart Cities, IEEE, https://ieeexplore.ieee.org/document/7238584, May 13-15, 2015, pp. 1-6.
Mustafa Al-Mashhadani, et al., Enhancing Traffic Flow By Using Vehicle Dashboard Traffic Lights, IEEE, https://ieeexplore.ieee.org/document/7390929, Sep. 6-9, 2015, pp. 1-5.

* cited by examiner

*Primary Examiner* — Shardul D Patel
(74) *Attorney, Agent, or Firm* — Joseph Zane; Eversheds Sutherland (US) LLP

(57) ABSTRACT

A vehicle including a transceiver, a vehicle component and a processor is disclosed. The transceiver may receive an input associated with traffic management at a geographical area. The vehicle component may output a visual signal. The visual signal may facilitate in the traffic management at the geographical area. The processor may obtain the input from the transceiver, and determine a type of the visual signal to output based on the input. The processor may generate a command signal for the vehicle component based on the type, and actuate the vehicle component based on the command signal.

20 Claims, 4 Drawing Sheets

VEHICLE AS A TRAFFIC MANAGEMENT COORDINATOR

FIELD

The present disclosure relates to a vehicle, and more particularly to a vehicle that may facilitate in traffic management.

BACKGROUND

Managing traffic on a road network or any other place may be challenging, as it requires coordination and communication, while minimizing disruptions. For instance, managing traffic at a road intersection point may be challenging. Traffic signals or lights at road intersection points are important for maintaining smooth traffic flow. Traffic lights provide immense convenience to commuters when the traffic lights are operating optimally. However, the commuters may face inconvenience when a traffic light at an intersection point starts to operate in a suboptimal manner. Such an instance may result in traffic jams.

Similarly, managing traffic at an event location (e.g., a location of a concert, sports event, etc.) may be challenging. Sometimes, poor traffic management may cause congestion at specific points (e.g., entry and/or exit point(s)), which may cause inconvenience to users.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
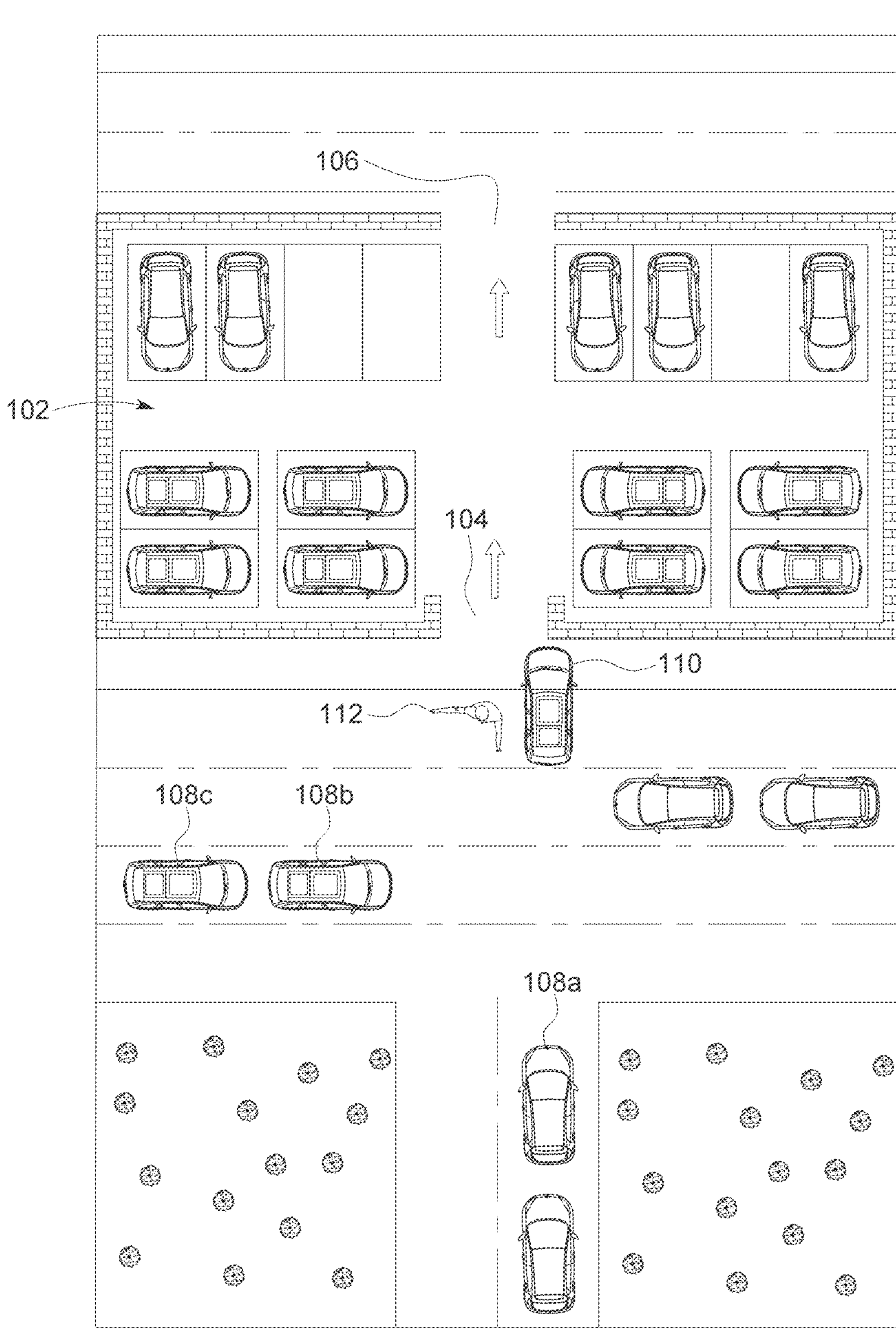
FIG. 1 depicts an example environment in which techniques and structures for providing the systems and methods disclosed herein may be implemented.

The present disclosure describes a vehicle that may facilitate in managing traffic at a geographical area. The geographical area may be or include, for example, a road network, a parking area (e.g., a parking area associated with a public/private event, a parking area associated with an institution/organization, etc.), and/or the like. In some aspects, the vehicle may manage the traffic at the road network (e.g., at an intersection point) when a traffic light may be operating in a sub-optimal manner or when there is no traffic light. The vehicle may use the vehicle's own components to manage the traffic at the geographical area. For example, the vehicle may use the vehicle's external lights to output a visual indication (or a visual signal) to other vehicles moving in the geographical area, in a manner similar to the traffic light. The visual signal may be indicative of a signal to “STOP”, “SLOW DOWN” or “GO”.

In some aspects, the vehicle may use a vehicle light unit and/or a vehicle display unit to output visual signal to the other vehicles moving in the geographical area to manage the traffic. The vehicle light unit may be vehicle's interior lights and/or exterior lights. For instance, the vehicle light unit may include a front facing light, a rear facing light, headlights, side vehicle lights, and/or the like. In some aspect, the vehicle light unit may include a plurality of light emitting diodes (LEDs) that may illuminate light of different colors (including red, green, or yellow), like the traffic light. The vehicle display unit may be located at a vehicle exterior portion (e.g., at the vehicle rear windshield), and may display messages such as “GO”, “STOP”, “SLOW DOWN”, etc.

In some aspects, the vehicle may include a traffic management unit (“unit”) that may control the operation of the light unit and/or the display unit (i.e., control the vehicle's component operation), to manage the traffic at the geographical area. In some aspects, the unit may obtain an input associated with the traffic management at the geographical area, and may control the vehicle component operation based on the obtained input. In some aspects, the input may include operator inputs from an operator who may be located at the geographical area. In this scenario, the unit may obtain the input via an operator device or a vehicle Human Machine Interface (HMI). For instance, an operator (e.g., a traffic officer who may be managing the traffic at the geographical area) may provide manual commands to the unit to switch the lights/messages associated with vehicle light unit or the vehicle display unit based on the traffic at the geographical area. In this case, the unit may obtain the manual commands from the operator, and control the operation of the vehicle light unit and/or the vehicle display unit based on the manual commands.

In further aspects, the unit may obtain the input from a vehicle sensor unit that may include vehicle cameras, radar sensors, lidar sensors, etc. In some aspects, the vehicle sensor unit may capture operator gestures when the operator may be managing the traffic at the geographical area. For instance, the sensor unit may monitor the operator's hand movement during traffic management (e.g., monitor a “stop” gesture in which the operator may raise one arm with palm facing outwards and fingers extended). The unit may obtain the operator gestures via the sensor unit, and may switch the lights/messages associated with the vehicle light unit or the vehicle display unit based on the operator gestures. For instance, the unit may actuate “red” light of the vehicle light unit when the operator gestures indicate the “stop” sign.

In further aspects, the vehicle sensor unit may capture real-time traffic information. The real-time traffic information may include real-time presence and location of other vehicles in the geographical area. The unit may obtain the input (e.g., the real-time traffic information) from the sensor unit, and may automatically control the vehicle component operation based on the real-time traffic information. Stated another way, the unit may automatically switch the lights/messages based on the real-time traffic information, without requiring the operator inputs.

In further aspects, the unit may determine an optimal vehicle position and/or an optimal vehicle orientation to position the vehicle in the geographical area based on the obtained input, to effectively manage the traffic. The unit may then cause the vehicle to move from a current vehicle position/orientation to the optimal vehicle position/orientation. In some aspects, the unit may actuate the vehicle component when the vehicle is in the optimal vehicle position and/or the optimal vehicle orientation.

The present disclosure describes a traffic management unit that may enable a vehicle to manage traffic by using vehicle's own existing components, when the traffic light may be operating in a suboptimal manner or when there may be no traffic light (e.g., at a parking area of a large event location). For instance, the unit may enable the vehicle to act like a traffic light to provide visual indications to other vehicles to direct the traffic, so that commuters may not face any inconvenience while driving in the geographical area.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102 that may be or include, for example, a road network, a parking area (e.g., a parking area associated with a public/private event, a parking area associated with an institution/organization, etc.), and/or the like. In some aspects, the geographical area 102 may include an entry point 104 and an exit point 106, as shown in FIG. 1. For instance, the parking area associated with a large event location (e.g., a location of a concert, sports events, etc.) may include the entry point 104 and the exit point 106. The entry point 104 may be a point from where one or more vehicles 108*a*, 108*b*, 108*c* (collectively referred as vehicles 108) may enter the geographical area 102. The exit point 106 may be a point from where the vehicles 108 may exit the geographical area 102. The entry point 104 and the exit point 106 may be located at any spot in the geographical area 102.

In further aspects, the geographical area 102 may be or include an intersection point or crossing on the road network. In some aspects, the geographical area 102 may include a traffic light (shown as traffic light 302 in FIG. 3) that may control the traffic movement at the intersection point/geographical area 102. The traffic light may be disposed at or in proximity to the intersection point. The intersection point, as described in the present disclosure, may mean a point on the road network through which one or more vehicles may travel in three or more directions. In an exemplary aspect, the intersection point may include traffic lights that may face in each direction (e.g., one or more traffic lights may face towards each road leading towards the intersection point), to enable smooth flow of traffic through the intersection point.

It is known that a traffic light provides visual indication to control the traffic movement in proximity to the traffic light. When the traffic light turns green, it serves as a signal that the vehicles are allowed to proceed through the intersection point. When the traffic light turns red, it serves as a signal that the vehicles should stop. When the traffic light turns yellow, it serves as a signal that the vehicles should slow down. A person ordinarily skilled in the art may appreciate that when the traffic lights at the intersection point are operating optimally, commuters may conveniently cross the intersection point. However, when one or more traffic lights may be malfunctioning or operating in a suboptimal manner, the commuters may face confusion and inconvenience, leading to traffic jams and chaotic/turbulent traffic flow at the intersection point.

The environment 100 may further include a vehicle 110 that may be configured to manage the traffic at the geographical area 102 (e.g., when the traffic light is in the suboptimal condition, or otherwise when there is no traffic light at the geographical area 102). For instance, the vehicle 110 may manage traffic at the entry point 104 and/or the exit point 106 associated with the parking area (or any other area). In addition, the vehicle 110 may manage the traffic at the road network (e.g., at an intersection point when one or more traffic lights may be operating in a suboptimal manner or when there is no traffic light on the road network).

The vehicle 110 may take the form of any passenger or commercial vehicle such as a car, a work vehicle, a crossover vehicle, a truck, a van, a minivan, a taxi, a bus, etc. The vehicle 110 may be a manually driven vehicle or may be configured to operate in a partially/fully autonomous mode. Further, the vehicle 110 may include any powertrain such as a gasoline engine, one or more electrically-actuated motor(s), a hybrid system, etc.

In some aspects, the vehicle 110 may include a vehicle component that may output a visual signal. The visual signal may facilitate in traffic management at the geographical area 102. In an exemplary aspect, the visual signal may be indicative of a signal to "STOP" (similar to the "red light" of the traffic light) or "GO" (similar to the "green light" of the traffic light). The operators of the vehicles 108 may view the real-time visual indication output from the vehicle component of the vehicle 110, and may operate their respective vehicle based on the visual indication. In this manner, even in the absence of a traffic light, the vehicle 110 may manage/control the flow of traffic in proximity to the vehicle 110, by outputting appropriate visual signals from the vehicle component.

Figure 2:
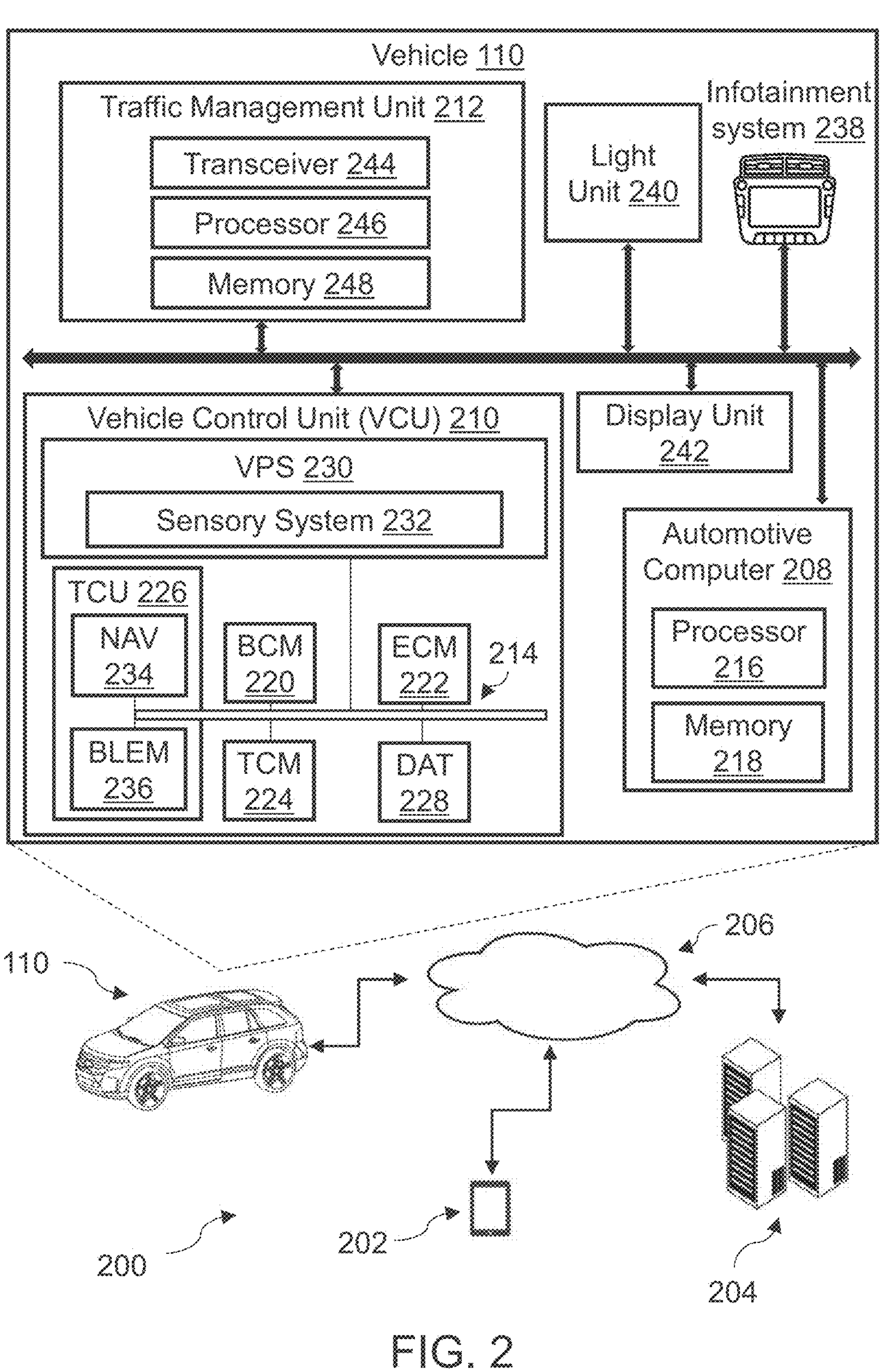
FIG. 2 depicts a block diagram of a system to manage traffic in accordance with the present disclosure.

In some aspects, the vehicle component may be a light unit (shown as a light unit 240 in FIG. 2). The light unit may be vehicle's interior lights and/or exterior lights. For instance, the light unit may include a front facing light, a rear facing light, headlights, side vehicle lights, and/or the like. In some aspects, the light unit may include a plurality of light emitting diodes (LEDs) that may be configured to illuminate light. Specifically, the light unit may include Red, Green, and Blue (RGB) LEDs that may emit light of different colors. In an exemplary aspect, the light unit may emit a first light (e.g., green light) to provide/output a visual indication to "GO", and may emit a second light (e.g., red light) to provide/output a visual indication to "STOP". In addition, the light unit may emit yellow light to provide/output a visual indication to "SLOW DOWN". In this manner, the light unit may act as a traffic light to direct/manage the traffic (or the flow of the vehicles 108) in proximity to the vehicle 110 at the geographical area 102.

Figure 3:
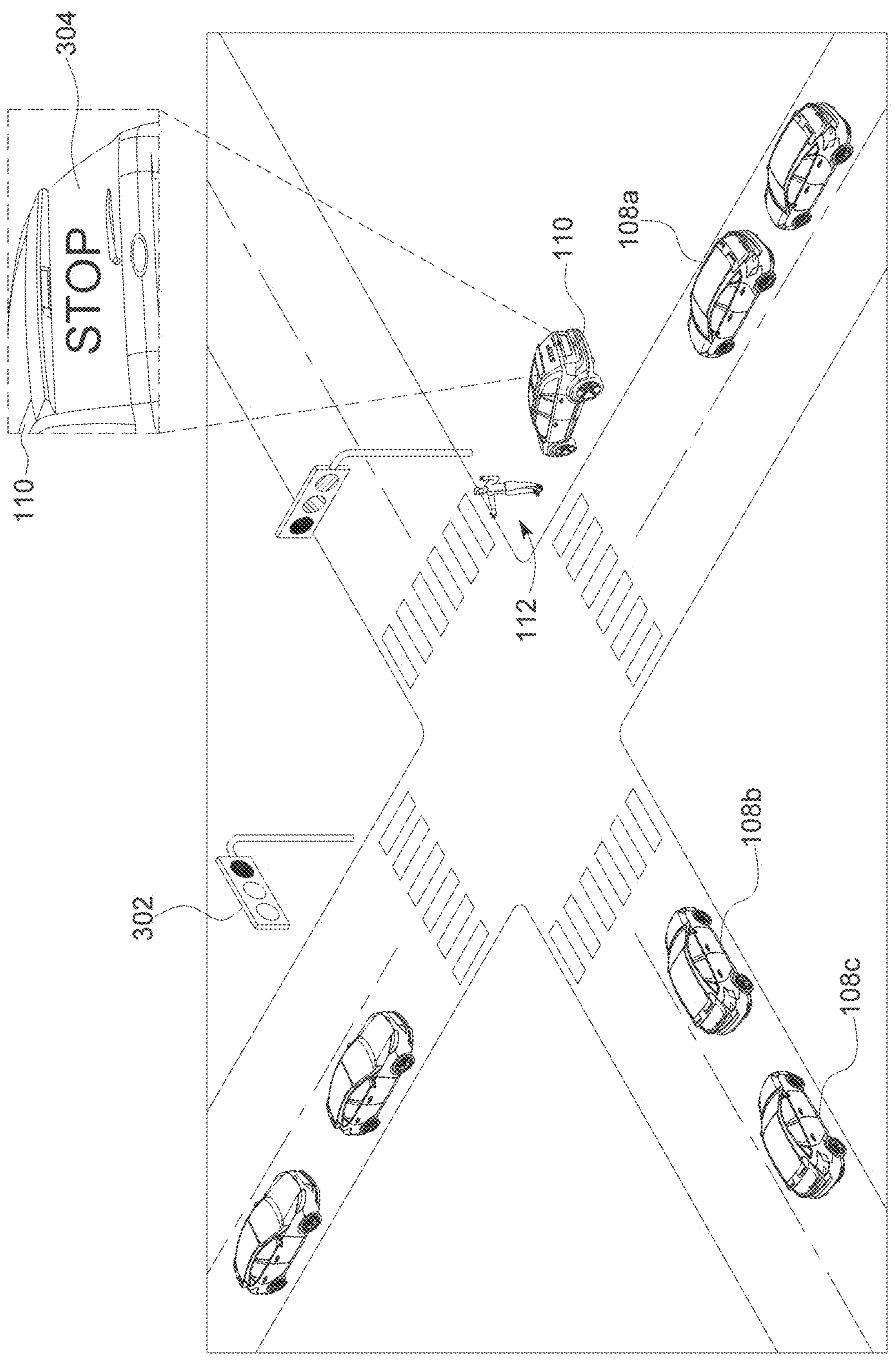
FIG. 3 depicts an example visual signal output from a vehicle in accordance with the present disclosure.

In further aspects, the vehicle component may be a display unit (shown as display unit 242 in FIG. 2). The display unit may be located at a vehicle exterior portion. In some aspects, the display unit may be integrated with the vehicle body (e.g., integrated to a rear windshield 304, as shown in FIG. 3). Alternatively, the display unit may be removably attached to the vehicle body. The display unit may display messages to output the visual indication/signal described above. For instance, the display unit may output a message "GO", "STOP", "SLOW DOWN", etc. to control/manage the traffic in proximity to the vehicle 110. In some aspects, the display unit may output the messages in synchronization with the LEDs. For instance, the display unit may output the message "GO" when the light unit emits the "green" light. In further aspects, the display unit may output a message indicating a predefined speed limit that the vehicles 110 should follow to move in the geographical area 102. In addition, the display unit may output a message indicating a delay time to cross a specific point (e.g., an estimated time to cross the entry point 104).

In some aspects, the vehicle 110 may include a traffic management unit (or "unit", shown as traffic management unit 212 in FIG. 2) that may facilitate the vehicle 110 to manage the traffic at the geographical area 102. The unit may enable the vehicle 110 to act as a traffic management coordinator to coordinate the vehicle movement and manage traffic at the geographical area 102 (e.g., manage the flow of traffic from different directions, similar to a traffic light). In some aspects, the unit may control the vehicle component operation to manage the traffic at the geographical area 102.

In some aspects, the unit may control the vehicle component operation based on operator inputs associated with an operator 112 who may be located at the geographical area 102 (e.g., a traffic officer who may be managing the traffic at the geographical area 102, such as at the entry point 104). In this scenario, the unit may obtain the operator inputs from an operator device (shown as operator device 202 in FIG. 2), via a network (shown as network 206 in FIG. 2). For instance, the unit may activate green/red light and/or display the message "STOP" or "GO" based on the operator inputs obtained by the unit via the operator device. In some aspects, the operator device may be, for example, a mobile phone, a laptop, a tablet, a smartwatch, or any other device having communication capability.

The network, as described above, illustrates an example communication infrastructure in which the connected devices discussed in various embodiments of this disclosure may communicate. The network may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In further aspects, in addition or alternative to obtaining the operator inputs to manage the traffic, the unit may obtain inputs from a vehicle's sensor unit (shown as sensory system 232 in FIG. 2), and control the vehicle component operation based on the inputs obtained from the sensor unit. In some aspects, the sensor unit may monitor operator gestures (e.g., an operator's hand movement) when the operator 112 may be manually managing the traffic at the geographical area 102 (e.g., when the traffic light 302 may not be operating or operating in a suboptimal manner, as shown in FIG. 3). In this case, the unit may obtain the real-time operator gestures, and control the vehicle component operation based on the real-time operator gestures to manage the traffic via the light unit and/or the display unit described above. For instance, the unit may actuate "red" light of the light unit when the operator's hand movement indicates a "stop" sign, and may actuate "green" light when the operator's hand movement indicates a "go" sign. In addition, the unit may activate the lights in a vehicle front portion, a vehicle rear portion, and/or vehicle side portions simultaneously to manage the traffic from different directions in proximity to the vehicle 110.

In further aspects, the unit may automatically control the vehicle component operation, without obtaining the operator inputs (including the operator gestures). In this case, the unit may dynamically monitor the real-time traffic (e.g., the real-time presence and location of the vehicles 108) at the geographical area 102 via the inputs obtained from the sensor unit, and may control the vehicle component operation based on the real-time traffic monitoring. In this scenario, the unit may dynamically actuate the green/red light (or display the messages of stop/go) based on the real-time traffic monitoring, to manage the traffic or direct the vehicles 108 at the geographical area 102. Stated another way, in this case, the unit may dynamically switch lights and/or messages based on the real-time traffic monitoring.

In addition, the unit may determine an optimal vehicle position and/or an optimal vehicle orientation associated with the vehicle 110 at the geographical area 102, to effectively manage the traffic. The optimal vehicle position/orientation may be that position/orientation of the vehicle 110 at which relevant lights and/or the display unit are positioned facing the direction of the traffic that is to be managed, to effectively control the traffic/vehicle movement at the geographical area 102. Responsive to determining the optimal vehicle position/orientation, the unit may cause the vehicle 110 to position itself at the optimal vehicle position/orientation. In some aspects, the unit may actuate the vehicle component when the vehicle 110 is located at the optimal vehicle position and/or the optimal vehicle orientation.

Further vehicle 110 details are described below in conjunction with FIG. 2.

The vehicle 110 implements and/or performs operations, as described here in the present disclosure, in accordance with the owner manual and safety guidelines. In addition, any action taken by a vehicle user (or the operators of the vehicles 108) based on the notifications/recommendations provided by the vehicle 110 should comply with all the rules specific to the location and operation of the vehicles 108, 110 (e.g., Federal, state, country, city, etc.). The notifications/recommendations, as provided by the vehicle 110, should be treated as suggestions and only followed according to any rules specific to the location and operation of the vehicles 108, 110.

FIG. 2 depicts a block diagram of a system 200 to manage traffic in accordance with the present disclosure. While describing FIG. 2, references will be made to FIG. 3.

The system 200 may include the vehicle 110, an operator device 202 and one or more servers 204 (or a server 204) communicatively coupled with each other via one or more networks 206. The server 204 may be part of a cloud-based computing infrastructure and may be associated with and/or include a Telematics Service Delivery Network (SDN) that provides digital data services to the vehicle 110 and other vehicles (e.g., the vehicle 108, not shown in FIG. 2) that may be part of a vehicle fleet.

In further aspects, the server 204 may store map information associated with the geographical area 102 including information associated with locations of the entry point 104 and the exit point 106. The server 204 may transmit the map information to the vehicle 110 at a predefined frequency, or when the vehicle 110 transmits a request to the server 204 to obtain such information.

The vehicle 110 may include a plurality of units including, but not limited to, an automotive computer 208, a Vehicle Control Unit (VCU) 210, and a traffic management unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 110, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a traffic management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 110 systems, connected servers (e.g., the server(s) 204), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or sensory system 232 or "sensor unit").

The vehicle sensory system 232 may include one or more vehicle sensors including, but not limited to, a radio detection and ranging (radar) sensor configured for detection and localization of objects inside and outside the vehicle 110 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, a tire pressure sensor, ultrasonic sensors, etc. In some aspects, the vehicle sensory system(s) 232 and the TCU 226 may collectively be considered as a vehicle "sensor unit" that transmits inputs (e.g., images, real-time vehicle geolocation, etc.) to the unit 212.

The vehicle sensory system(s) 232 may capture inputs (e.g., images) associated with the vehicle's surroundings via, e.g., the vehicle cameras, the radar sensors, the lidar sensors, and/or the like. In some aspects, the vehicle sensory system(s) 232 may monitor operator gestures associated with the operator 112 when the operator 112 may be managing the traffic at the geographical area 102. For instance, the vehicle sensory system(s) 232 or the sensor unit may monitor the operator's hand movement during traffic management (e.g., monitor "stop" gesture in which the operator raises one arm with palm facing outwards and fingers extended). In addition, the sensor unit may monitor real-time traffic information in proximity to the vehicle 110 (e.g., real-time presence and location of the vehicles 108). Stated another way, the sensor unit may dynamically monitor traffic in proximity to the vehicle 110.

In some aspects, the VCU 210 may control vehicle operational aspects and implement one or more instruction sets received from the operator device 202, from one or more instruction sets stored in the memory 218, including instructions operational as part of the unit 212.

The TCU 226 may be configured and/or programmed to provide vehicle connectivity to wireless computing systems onboard and off board the vehicle 110 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 110 and other systems (e.g., the operator device 202, a key fob, an NFC device, etc.), computers, and modules. The NAV receiver 234 may be configured to determine the real-time vehicle geolocation. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the operator device 202, the server(s) 204, among others.

The BCM 220 generally includes integration of sensors, vehicle performance indicators, and variable reactors associated with vehicle systems and may include processor-based power distribution circuitry that can control functions associated with the vehicle body such as a light unit 240, a display unit 242 (same as the light unit and the display unit described above in conjunction with FIG. 1), windows, security, camera(s), fan, headlights, audio system(s), speakers, wipers, door locks and access control, mirrors, various comfort controls, enclosures, and/or the like. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions/inputs via the touchscreen interface portion and/or display notifications/recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 110, may include a transceiver 244, a processor 246, and a computer-readable memory 248.

The transceiver 244 may receive information/inputs from one or more external devices or systems, e.g., the operator device 202, the server(s) 204, and/or the like via the network 206. For example, the transceiver 244 may receive instructions to actuate the vehicle component (e.g., the light unit 240 and/or the display unit 242) based on the operator inputs. In addition, the transceiver 244 may receive the map information from the server 204 via the network 206. Further, the transceiver 244 may transmit notifications (e.g., alert/alarm signals) to the external devices or systems. In addition, the transceiver 244 may receive information/inputs from vehicle 110 components such as the infotainment system 238, the vehicle sensory system 232, the TCU 226, and/or the like. Further, the transceiver 244 may transmit notifications (e.g., alert/alarm/command signals) to the vehicle 110 components such as the infotainment system 238, the BCM 220, etc.

The processor 246 and the memory 248 may be the same as or similar to the processor 216 and the memory 218, respectively. In some aspects, the processor 246 may utilize the memory 248 to store programs in code and/or to store data for performing aspects in accordance with the disclosure. The memory 248 may be a non-transitory computer-readable medium or memory storing the traffic management program code. In some aspects, the memory 248 may store the map information that the vehicle 110 obtains from the server 204.

In operation, when the operator 112 (or a user) desires to use the vehicle 110 to manage the traffic at the geographical area 102, the operator 112 may transmit a request to the transceiver 244 to activate a traffic management mode of the vehicle 110. The vehicle 110 may provide/output visual signals to the vehicles 108 to manage the traffic in the geographical area 102 when the traffic management mode may be activated on the vehicle 110. In some aspects, the operator 112 may transmit the request described above to the transceiver 244 via the infotainment system 238 (or any vehicle button), or via the operator device 202. When the operator 112 transmits the request, the processor 246 may obtain a trigger signal from the transceiver 244 to activate the traffic management mode. Responsive to obtaining the trigger signal, the processor 246 may activate the traffic management mode. In some aspects, the processor 246 may additionally perform operator authentication prior to activating the traffic management mode.

Responsive to activating the traffic management mode, the processor 246 may obtain an input associated with traffic management at the geographical area 102, via the transceiver 244. In one exemplary aspect, the processor 246 may obtain the input from the operator device 202 (or the infotainment system 238). The input may be manual commands from the operator 112 to control/operate the vehicle component operation. For instance, the operator 112 may monitor the traffic at the geographical area 102, and may provide/transmit commands to switch the light unit 240 from green light to red light or vice versa to manage the traffic via the operator device 202 (or the infotainment system 238). Similarly, the operator 112 may provide/transmit the commands, via the operator device 202, to display messages (e.g., stop/go messages) on the display unit 242 (e.g., on a vehicle rear windshield 304, as shown in FIG. 3).

In another exemplary aspect, the processor 246 may obtain the input from the sensor unit (e.g., the vehicle cameras, radar sensors, lidar sensors, etc.). In some aspects, the input may include operator gestures that may be captured by the sensor unit. The sensor unit may capture the operator gestures when the operator 112 may be managing the traffic at the geographical area 102 (e.g., when the traffic light 302 may not be operating or operating in a suboptimal manner). For example, the sensor unit may capture/monitor the operator's hand movement during traffic management (e.g., monitor "stop" gesture in which the operator 112 raises one arm with palm facing outwards and fingers extended, as shown in FIG. 3).

In yet another exemplary aspect, the input may include real-time traffic information (e.g., real-time presence and location of the vehicles 108), which may be captured by the sensor unit.

Responsive to obtaining the input from the transceiver 244 and/or the sensor unit as described above, the processor 246 may determine/select an optimal type of the visual signal to output based on the obtained input, to efficiently manage the traffic at the geographical area 102. For instance, the processor 246 may select to output a "green" light (or "red" light) from the light unit 240 or display a message "GO" (or "STOP") on the display unit 242 based on the obtained input.

In some aspects, the processor 246 may select/determine the visual signal type based on the operator inputs obtained via the operator device 202/infotainment system 238. For instance, the processor 246 may determine the visual signal type as "red" light when the operator 112 provides a manual command to emit the "red" light to stop the vehicles 108. In another example, the processor 246 may determine the visual signal type as a message "STOP" to be displayed on the display unit 242, when the operator 112 provides the manual command to display the message "STOP". In further aspects, the processor 246 may determine the visual signal type as "red" light when the operator gestures indicate a "STOP" signal (e.g., when the operator 112 raises one arm with palm facing outwards and fingers extended). Similarly, the processor 246 may determine the visual signal type based on the real-time traffic information or dynamic traffic monitoring (determined based on the inputs obtained from the sensor unit). For example, the processor 246 may determine the visual signal type as "green" light when a traffic stream on a lane reaches a specific length (or crosses a predefined length threshold).

Responsive to determining/selecting the visual signal type as described above, the processor 246 may generate a command signal for the vehicle component (e.g., the light unit 240 and/or the display unit 242) based on the visual signal type, and transmit the command signal to the vehicle component to actuate the vehicle component based on the command signal. For instance, the processor 246 may actuate the light unit 240 to emit "green" light, "red" light, and/or may actuate the display unit 242 to display message "GO", "STOP", etc., based on the command signal.

In addition, in some aspects, the processor 246 may activate the vehicle lights in a vehicle front portion, a vehicle rear portion, and/or vehicle side portions simultaneously to manage the traffic from different directions. For example, the vehicle 110 may emit "red" light from the vehicle front portion, and may emit "green" light from the vehicle side portion. In another example, the vehicle 110 may emit "red" light from all directions to allow the walkers to cross the road. In other aspects, the processor 246 may activate the vehicle lights only at one vehicle portion to manage the traffic from one direction, such that only single route paths can be given a green (go)/red (stop) command at a single instance in time.

Furthermore, the processor 246 may actuate the light unit 240 and the display unit 242 simultaneously based on the obtained input. Alternatively, the processor 246 may select either the light unit 240 or the display unit 242 based on the obtained input, and actuate the light unit 240 or the display unit 242 based on the selection.

In some aspects, the processor 246 may actuate the "red" light or display the message "STOP" on the rear windshield 304 when the processor 246 obtains such command(s) from the operator 112, via the operator device 202 or the infotainment system 238. Alternatively, the processor 246 may actuate the "red" light or display the message "STOP" on the rear windshield 304 when the processor 246 obtains the operator gestures that provide an indication to "STOP", as shown in FIG. 3. In addition, the processor 246 may actuate the "red" light or display the message "STOP" based on the real-time traffic information (obtained from the sensor unit). In this scenario, the processor 246 may switch the lights/messages after a predetermined time duration, or when each traffic stream reaches a specific length (or crosses a pre-defined length threshold). For example, the processor 246 may switch the lights after every 30 seconds. In some aspects, thresholds associated with the time/length may vary based on each incoming traffic source. Stated another way, the processor 246 may update the thresholds based on traffic in different routes. The processor 246 may actuate the vehicle component (e.g., the light unit 240 and/or the display unit 242) based on the updated threshold.

In further aspects, the processor 246 may determine an optimal vehicle position for vehicle 110 in the geographical area 102 based on the obtained input, at which the vehicle 110 may efficiently manage the traffic. The processor 246 may determine the optimal vehicle position based on the input obtained from the operator 112 and/or the sensor unit. An example process of determining the optimal vehicle position is described below, which should not be construed as limiting.

In an exemplary aspect, the processor 246 may first determine the entry point 104 and/or the exit point 106 in the geographical area 102 based on the operator inputs or the pre-stored map information associated with the geographical area 102 (which may be pre-stored in the memory 248 and/or the server 204). Responsive to determining the entry point 104 and/or the exit point 106, the processor 246 may determine one or more expected routes of the vehicles 108 in the geographical area 102 based on the entry point 104 and/or the exit point 106. Stated another way, the processor 246 may determine the pattern in which the vehicles 108 may enter/exit the geographical area 102, and determine the expected routes based on the pattern.

The processor 246 may then determine the optimal vehicle position based on the expected routes. For example, the processor 246 may determine that the optimal vehicle position is in proximity to the entry point 104. Responsive to determining the optimal vehicle position, the processor 246 may cause the vehicle 110 to move to the optimal vehicle position. When the vehicle 110 may be located at the optimal vehicle position, the processor 246 may determine the visual signal type, as described above, and actuate the vehicle component (e.g., the light unit 240 and/or the display unit 242). In some aspects, the processor 246 may determine a vehicle current location via GPS, and may cause the vehicle 110 to automatically move from its current location to the optimal vehicle position.

In additional aspects, the processor 246 may determine an optimal vehicle orientation for the vehicle 110 in the geographical area 102, to effectively manage the traffic in the geographical area 102. In some aspects, the processor 246 may determine the optimal vehicle orientation when the vehicle 110 may be positioned at the optimal vehicle position. The processor 246 may determine the optimal vehicle orientation such that the relevant lights and/or the display unit 242 are positioned facing the direction of the traffic that is to be managed.

In some aspects, the processor 246 may determine the optimal vehicle orientation based on the input obtained from the operator 112. In other aspects, the processor 246 may determine the optimal vehicle orientation based on the input obtained from the sensor unit. For instance, the sensor unit may capture information associated with the traffic flow in proximity to the vehicle 110/optimal vehicle position. The processor 246 may use the traffic flow information and determine the optimal vehicle orientation based on the traffic flow information. In further aspects, the processor 246 may determine an operator orientation based on the input obtained from the sensor unit, when the operator 112 may be managing the traffic. The processor 246 may determine the optimal vehicle orientation based on the operator orientation.

Responsive to determining the optimal vehicle orientation, the processor 246 may cause the vehicle 110 to move or orient itself to the optimal vehicle orientation (e.g., move from a vehicle's current orientation to the optimal vehicle orientation). Alternatively, the operator 112 may manually position the vehicle 110 at the optimal vehicle orientation, when the processor 246 determines the optimal vehicle orientation. When the vehicle 110 may be located at the optimal vehicle orientation, the processor 246 may determine the visual signal type, as described above, and actuate the vehicle component (e.g., the light unit 240 and/or the display unit 242).

In further aspects, the processor 246 may obtain a pre-defined speed limit (or a "lower speed limit") for driving in the geographical area 102 from the server 204 (or other any computing device associated with the geographical 102), the operator device 202, the operator 112, and/or the like. Responsive to obtaining the lower speed limit, the processor 246 may actuate the vehicle component (e.g., the display unit 242) to output/display a first notification that indicates the lower speed limit.

In a similar manner, the processor 246 may determine a delay time to cross a specific point (e.g., the entry point 104) based on the inputs obtained from the sensor unit, and may actuate the vehicle component (e.g., the display unit 242) to output a second notification that indicates the delay time. The vehicle 110 may additionally relay the delay time to the vehicles 108 via the V2V or V2I communication (via a vehicle loading bar, just as electric vehicle battery capacity when charging), which may be displayed at the HMIs of the respective vehicles. In addition, the processor 246 may output a third notification to the vehicles 108 via V2V communication or V2I communication (that may be displayed on the respective vehicles' HMIs) to manage the traffic at the geographical area 102. The third notification may include command signals associated with vehicle movement. As described above, the processor 246 may transmit the third notification to the vehicles' HMIs via the V2V or V2I communication. In some aspects, the vehicle 110 may coordinate with the vehicles 108 (and other vehicles in the geographical area 102) to provide a coordinated traffic solution, via V2V or V2I communication.

In further aspects, the processor 246 may determine a priority information associated with the vehicles 108 moving in the geographical area 102. For instance, a fleet manager may prioritize some vehicles over others where certain vehicles are allowed to 'go first' because of timing requirements or cargo perishability or for other reasons. The fleet manager may provide the priority information to the processor 246 via a fleet manager device. The processor 246 may obtain the priority information (that may include the information of a priority vehicle) and may determine the visual signal type based on the priority information. For instance, the processor 246 may determine/select the "green" light of the light unit 240 when the processor 246 identifies the priority vehicle from the vehicles 108 (e.g., via the vehicle cameras), to allow the priority vehicle to move first without any delay. As an example, when there is a shortage of a part in a manufacturing plant, the fleet manager may prioritize vehicles transporting those time critical parts, which enables quick prioritization and reprioritization of vehicles saving time for time critical shipments and deliveries. In some aspects, the fleet manager may provide inputs or configure the vehicle 110 to stop on geo-fenced depots/marshaling lots/parking lots and other spaces to enhance the traffic management at such places.

Figure 4:
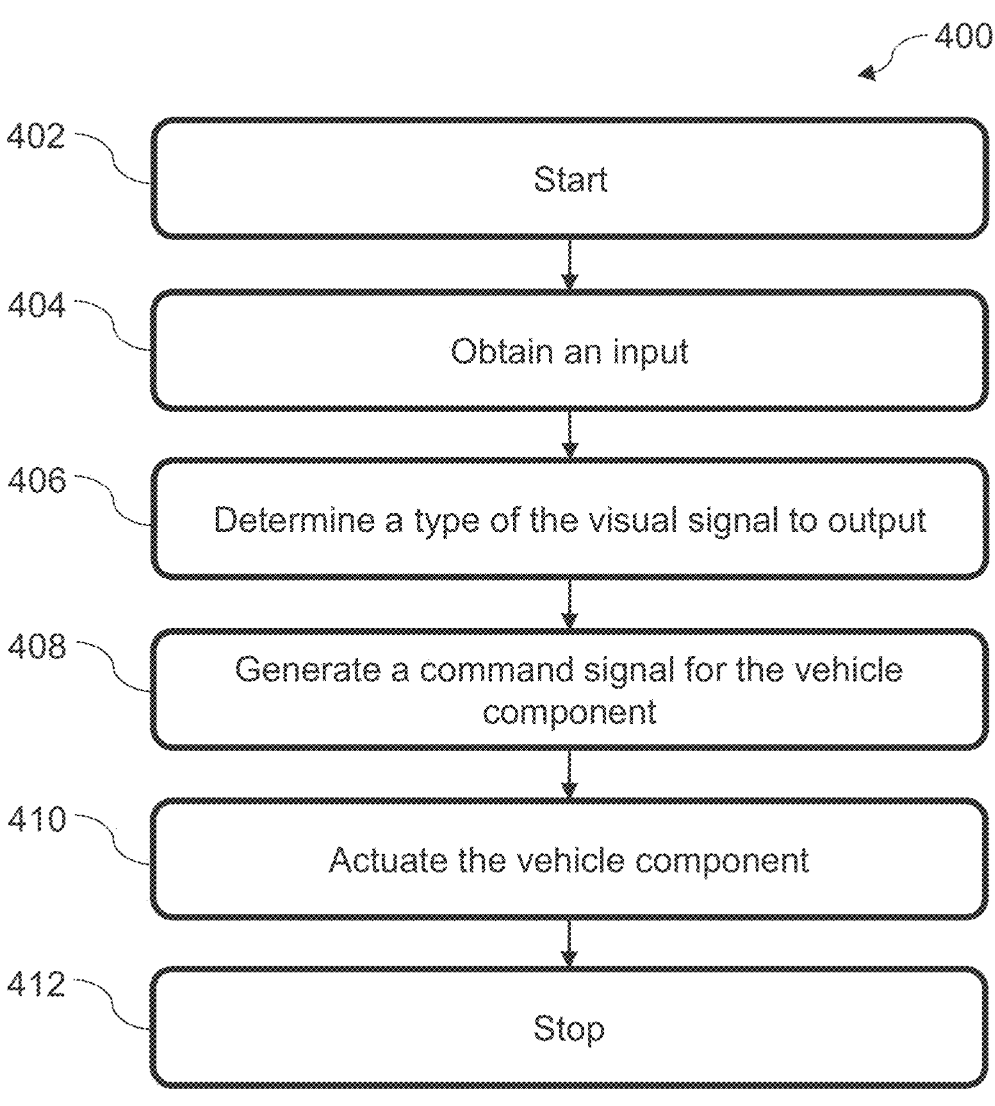
FIG. 4 depicts a flow diagram of an example method to manage traffic in accordance with the present disclosure.

FIG. 4 depicts a flow diagram of an example method 400 to manage traffic in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 246, an input from the transceiver 244. The input may be associated with traffic management at the geographical area 102. The input may include an input from the operator 112, an input from the sensor unit, and/or the like.

At step 406, the method 400 may include determining, by the processor 246, a type of the visual signal to output based on the input. At step 408, the method 400 may include generating, by the processor 246, a command signal for the vehicle component (e.g., the light unit 240 and/or the display unit 242) based on the determined visual signal type. At step 410, the method 400 may include actuating, by the processor 246, the vehicle component based on the command signal.

At step 412, the method 400 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a transceiver configured to receive an input associated with traffic management at a geographical area;

one or more vehicle components configured to output a visual signal, wherein the visual signal facilitates in the traffic management at the geographical area, and wherein the one or more vehicle components comprises a vehicle display unit located at an exterior portion of the vehicle and configured to display a plurality of textual messages; and a processor configured to:

obtain the input from the transceiver;

determine a type of the visual signal to output based on the input;

generate a command signal for the one or more vehicle components based on the type of the visual signal; and actuate the one or more vehicle components based on the command signal such that the vehicle display unit displays one or more of the plurality of textual messages.

2. The vehicle of claim 1, wherein the visual signal is indicative of a STOP signal or a GO signal for traffic management.

3. The vehicle of claim 1, wherein the one or more vehicle components further comprises a vehicle light unit comprising Red, Green, and Blue (RGB) light emitting diodes (LEDs).

4. The vehicle of claim 3, wherein the vehicle light unit comprises at least one of: a front facing light, a rear facing light, headlights, or side vehicle lights.

5. The vehicle of claim 1, wherein the plurality of textual messages comprises a "GO" message, a "STOP" message, and a "SLOW DOWN" message.

6. The vehicle of claim 1, wherein the transceiver is further configured to obtain a trigger signal to activate a traffic management mode of the vehicle, and wherein the processor is further configured to:

obtain the trigger signal from the transceiver;

activate the traffic management mode responsive to obtaining the trigger signal; and obtain the input from the transceiver responsive to activating the traffic management mode.

7. The vehicle of claim 1, wherein the transceiver is configured to receive the input from an operator device, and wherein the input comprises manual commands to operate the one or more vehicle components.

8. The vehicle of claim 1, further comprising a sensor unit that comprises at least one of: a vehicle camera, a Radio Detection and Ranging (radar) sensor, or a Light Detection and Ranging (lidar) sensor.

9. The vehicle of claim 8, wherein the sensor unit is configured to monitor operator gestures of an operator located in proximity to the vehicle, wherein the processor is further configured to:

obtain the input from the sensor unit via the transceiver, wherein the input comprises information associated with the operator gestures; and determine the type of the visual signal based on the information associated with the operator gestures.

10. The vehicle of claim 8, wherein the sensor unit is further configured to dynamically monitor traffic in proximity to the vehicle, and wherein the processor is further configured to:

obtain the input from the sensor unit via the transceiver, wherein the input is associated with the dynamic monitoring of the traffic; and determine the type of the visual signal based on the dynamic monitoring.

11. The vehicle of claim 8, wherein the processor is further configured to:

determine an optimal vehicle orientation in the geographical area to manage traffic, based on the input obtained from the sensor unit;

automatically position the vehicle in the optimal vehicle orientation; and actuate the one or more vehicle components when the vehicle is in the optimal vehicle orientation.

12. The vehicle of claim 11, wherein the processor is further configured to:

determine an operator orientation based on the input obtained from the sensor unit; and determine the optimal vehicle orientation based on the operator orientation.

13. The vehicle of claim 1, wherein the processor is further configured to:

determine an entry point and an exit point associated with the geographical area;

determine one or more expected routes of one or more second vehicles in the geographical area based on the determination of the entry point and the exit point;

determine an optimal vehicle position in the geographical area to manage traffic based on the determination of the one or more expected routes;

cause the vehicle to move to the optimal vehicle position; and actuate the one or more vehicle components when the vehicle is in the optimal vehicle position.

14. The vehicle of claim 13, wherein the processor is further configured to determine the entry point and the exit point based on a pre-stored map of the geographical area or operator inputs obtained from an operator.

15. The vehicle of claim 1, wherein the processor is further configured to output a first notification to at least one of: one or more second vehicles located in the geographical area via vehicle-to-vehicle (V2V) communication or to infrastructure via vehicle-to-infrastructure (V2I) communication, and wherein the first notification comprises command signals associated with vehicle movement of the one or more second vehicles.

16. The vehicle of claim 1, wherein the processor is further configured to:

obtain a predefined speed limit associated with the geographical area; and output a second notification that indicates the predefined speed limit.

17. The vehicle of claim 1, wherein the processor is further configured to:

determine a priority information associated with one or more second vehicles located at the geographical area; and determine the type of the visual signal based on the priority information.

18. The vehicle of claim 17, wherein the processor is further configured to obtain the priority information from a fleet manager via the transceiver.

19. A method comprising:

obtaining, by a processor, an input associated with traffic management at a geographical area;

determining, by the processor, a type of a visual signal to output based on the input, wherein the visual signal facilitates in the traffic management at the geographical area;

generating, by the processor, a command signal for one or more vehicle components based on the type of the visual signal, wherein the one or more vehicle components comprises a vehicle display unit located at an exterior portion of the vehicle and configured to display a plurality of textual messages; and actuating, by the processor, the one or more vehicle components based on the command signal such that the vehicle display unit displays one or more of the plurality of textual messages.

20. A non-transitory computer-readable storage medium having instructions stored thereupon which, when executed by a processor, cause the processor to:

obtain an input associated with traffic management at a geographical area;

determine a type of a visual signal to output based on the input, wherein the visual signal facilitates in the traffic management at the geographical area;

generate a command signal for one or more vehicle components based on the type of the visual signal, wherein the one or more vehicle components comprises a vehicle display unit located at an exterior portion of the vehicle and configured to display a plurality of textual messages; and actuate the one or more vehicle components based on the command signal such that the vehicle display unit displays one or more of the plurality of textual messages.

* * * * *